United States Patent
Rempala et al.

[15] 3,649,119
[45] Mar. 14, 1972

[54] AUTOMATIC IMAGE ROTATOR FOR MICRO-IMAGE READER-PRINTER

[72] Inventors: Chester S. Rempala; Robert W. Murre, both of Chicago, Ill.

[73] Assignee: Bell & Howell Company, Chicago, Ill.

[22] Filed: Mar. 11, 1970

[21] Appl. No.: 18,429

[52] U.S. Cl. .............................................355/45, 353/78
[51] Int. Cl. ...............................................G03b 27/70
[58] Field of Search ..............................355/45, 66; 353/78

[56] References Cited

UNITED STATES PATENTS

| | | | |
|---|---|---|---|
| 2,769,369 | 11/1956 | Oiler | 355/45 X |
| 2,548,554 | 4/1951 | Nivison | 353/78 |
| 2,505,505 | 4/1950 | Sachtleben | 353/78 |
| 2,940,358 | 6/1960 | Rosenthal | 355/66 |

*Primary Examiner*—John M. Horan
*Attorney*—Jack H. Hall

[57] ABSTRACT

Apparatus for automatically rotating an enlarged microfilm image through an angle of 90° from a first orientation as projected onto a projection screen to a second orientation as projected onto the image plane of a printout station. The image rotating apparatus includes a motor driven prism controlled by a pair of electrical switches actuated by a member secured to the prism carrier which defines limit positions of the prism to automatically effect reorientation of the projected image responsive to actuation of the printing cycle mechanism.

6 Claims, 5 Drawing Figures

Inventors:
Chester S. Rempala,
Robert W. Murre.

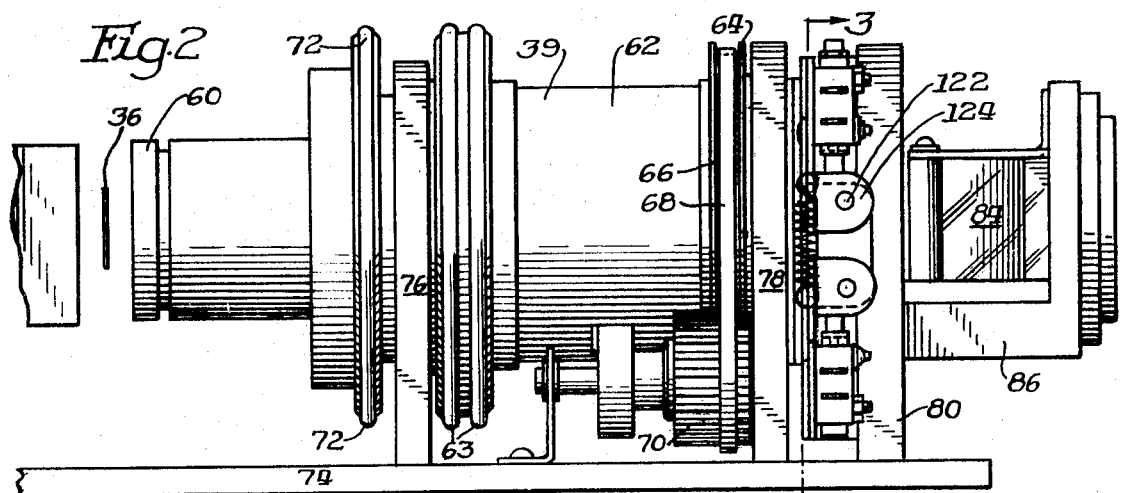
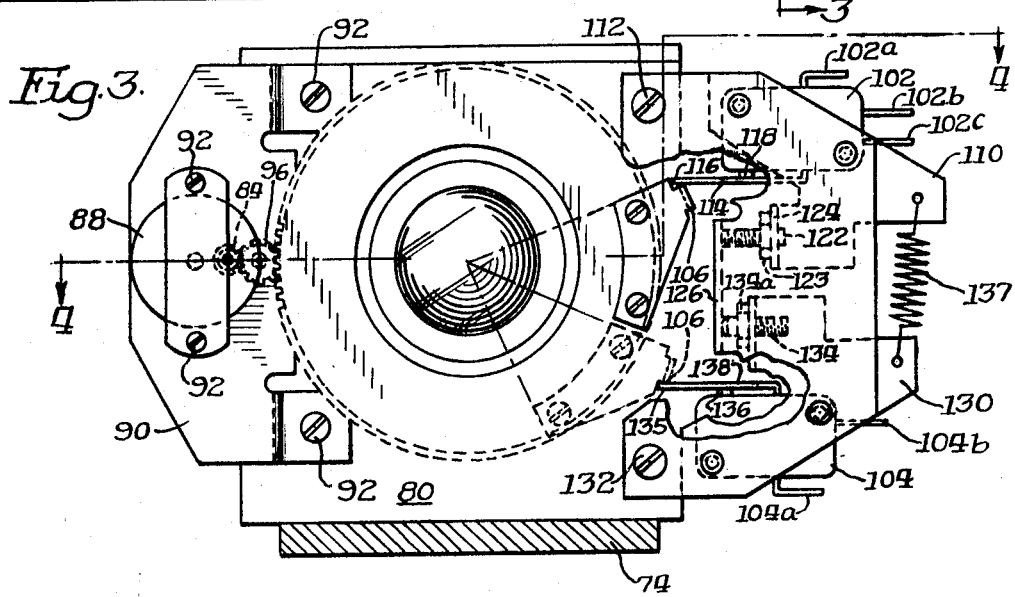
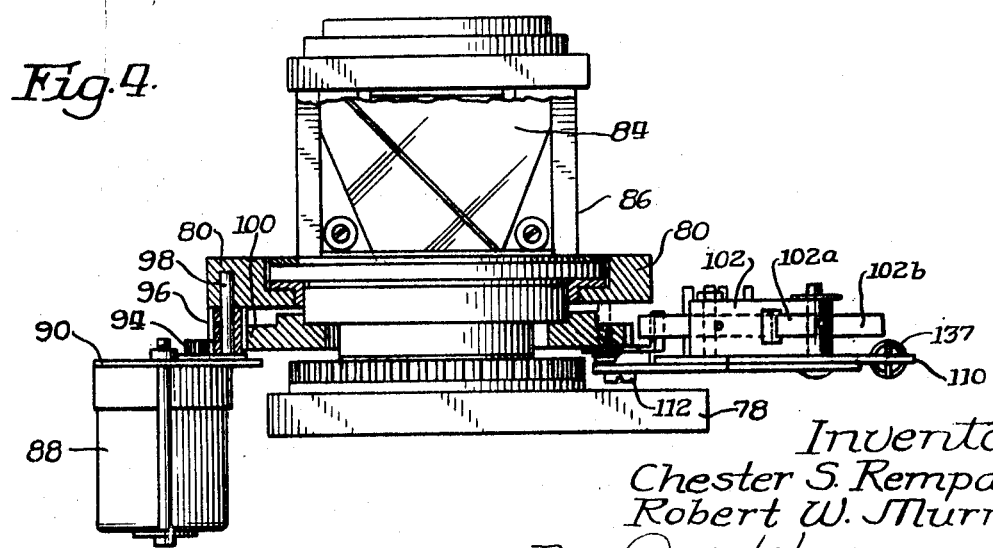

AUTOMATIC IMAGE ROTATOR FOR MICRO-IMAGE READER-PRINTER

FIELD OF THE INVENTION

This invention relates in general to micro-image reader-printers. In particular, this invention relates to apparatus for automatically rotating an enlarged micro-image from the orientation in which it is projected onto a projection screen to a different orientation for projection of the enlarged image onto the image plane of a printout station.

DESCRIPTION OF THE PRIOR ART

In one well-known variety of micro-image reader-printer, a micro-image carried on a strip of microfilm is enlarged and projected onto a screen for viewing by the operator. Since the image contained on the film may be oriented either horizontally or vertically, manual image rotating means are provided to facilitate reading vertical images by rotating them to a horizontal orientation.

The enlarged image is projected onto the screen of the reader-printer through the use of suitable mirrors or other reflective devices. The image may be selectively projected from the screen to an image plane of a printout station whereat a permanent xerographic reproduction of the enlarged image may be obtained. However, the image projected onto the image plane normally assumes an orientation similar to the orientation assumed when projected onto the projection screen, that is, if the image is projected onto the screen so that the printed matter is oriented horizontally, then the printed matter projected onto the image plane will extend sideways. Conversely, if the image is projected so that the material reads vertically on the screen, the text would be projected onto the image plane to read vertically, or front to back.

Printout stations typically use 8½ inch by 11 inch letter size copy paper disposed such that the horizontal dimension on the projection screen appears widthwise or along the 8½ inch dimension of the copy sheet. However, the projection screens of such readers are typically square and extend widthwise greater than 8½ inches. Thus, when a micro-image is enlarged on the reader screen to a total horizontal dimension greater than 8½ inches and that enlarged image is projected onto the image plane of the printout station, a substantial side border portion of the enlarged image is lost to the user.

In a particular specialized micro-film application involving storage of computer printed information on microfilm, the images are disposed with the printed matter oriented horizontally. Thus, upon reproducing a greatly enlarged copy, the side borders of the image projected on to the image plane extend beyond the copy paper and are not reproduced.

SUMMARY OF THE INVENTION

This invention obviates the above-mentioned problems and difficulties encountered in printing out enlarged micro-images by providing automatic image rotating apparatus for automatically reorienting an enlarged image from the orientation in which it is projected onto the projection screen to a different orientation for projection of the image onto the image plane of a printout station.

In accordance with the invention, an image rotating prism interposed in the image light path is mounted on a motor driven carrier adapted for rotation through a given angle. Movement of the carrier is controlled by a pair of switches cooperating with a switch actuating member secured to the prism carrier. The switches are electrically connected to the motor so that movement of the carrier is initiated responsive to actuation of a printing button. The carrier is driven from its home position whereat the image is projected onto the screen, to an operational position whereat the rotated image is projected by associated mirrors onto the image plane. Upon completion of the printing cycle the carrier is returned to its home position and the image is again projected onto the screen in its original orientation.

Accordingly, the primary object of this invention is to provide apparatus for automatically angularly displacing a projected image.

Another object of this invention is to provide in a micro-image reader-printer including apparatus for projecting an enlarged image onto a screen in a given orientation, means for automatically projecting the same image onto an image plane in a different orientation.

An additional object of this invention is to provide means for reorienting an image projected onto a screen, as compared to projection of the image onto an image plane, including a motor driven prism, a pair of switches and switch actuating means for energizing the prism motor responsive to energization and deenergization of an associated printout station.

Additional objects of this invention will become apparent to those versed in the art upon an understanding of the following detailed description of the micro-image reader-printer and image rotating apparatus of the invention taken in conjunction with the accompanying drawings in which a preferred embodiment of the invention is shown, and wherein:

FIG. 2 is an enlarged right-side elevational view of a portion of the reader-printer optical system including the automatic image rotating apparatus of the invention;

FIG. 3 is an elevational view of a portion of the optical system shown in FIG. 2 as viewed along line 3—3 thereof;

FIG. 4 is a top plan, partial cross-sectional view of the image rotating apparatus of the invention as viewed along offset section line 4—4 of FIG. 3.

Figure 1:
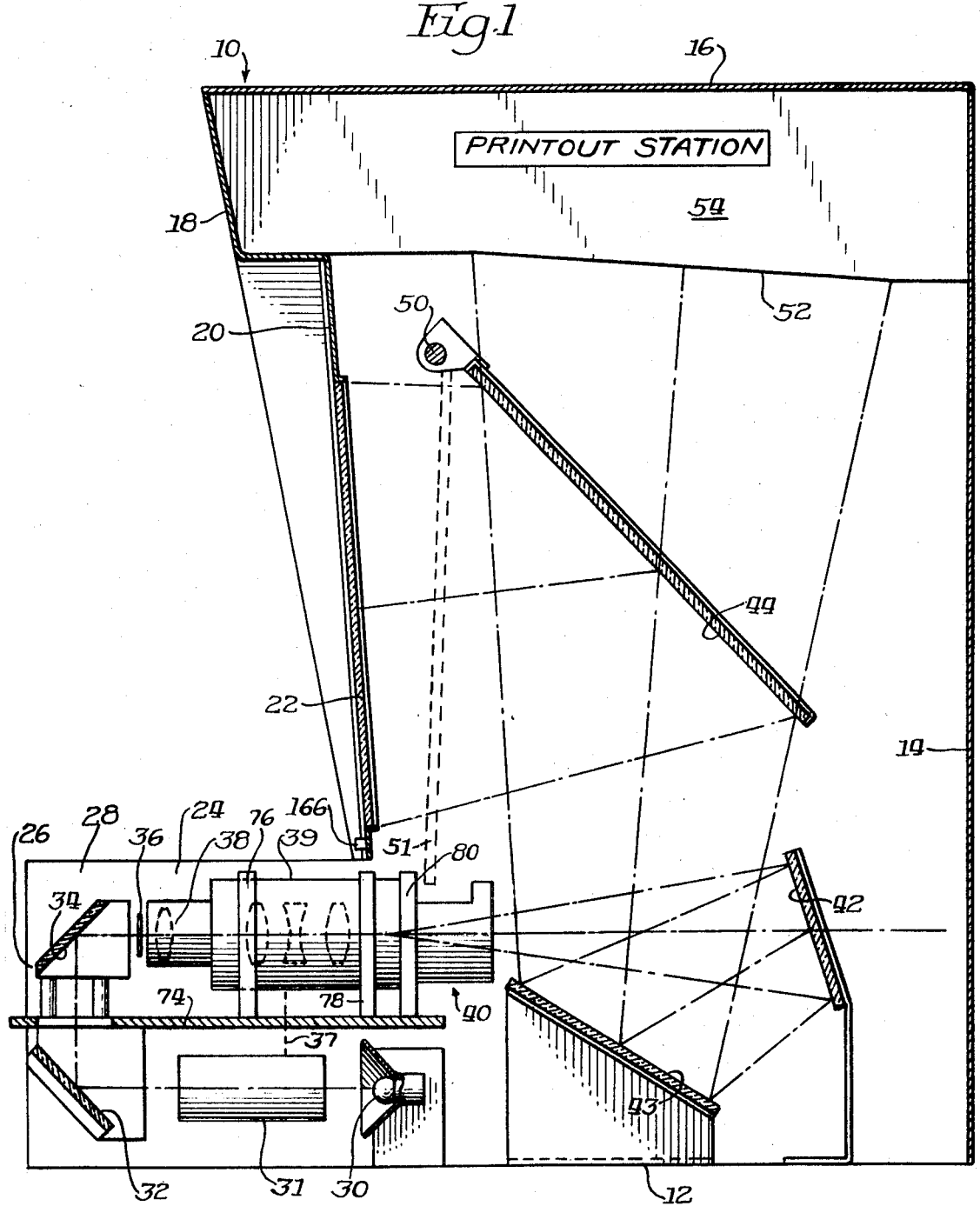
FIG. 1 is a right-side elevational view of a micro-image reader-printer incorporating the automatic image rotating apparatus of the invention.

Referring now to FIG. 1 of the drawings, a micro-image reader-printer generally referred to by reference numeral 10 is seen to include a cabinet comprising a bottom wall 12, a back wall 14, a top wall 16 and a front wall 18. The front wall includes a recessed portion 20 carrying a centrally disposed fine grain projection screen 22 for viewing the enlarged image projected onto its back surface. A horizontal shelf 24 extends forwardly adjacent the bottom edge of the projection screen to a lower front wall 26. Shelf 24, bottom wall 12, and lower front wall 26 form a chamber 28 which houses an incandescent light source 30, a light condenser 31, a pair of reflective mirrors 32 and 34 for directing condensed light from the source through a micro-image contained on a film strip 36, a projection or prime lens system 38, and a zoom lens system 39.

The zoom lens system enables the user to vary the size of the image projected onto the screen and may be coupled to the light condenser, schematically shown at 37, to provide optical compensation of the components as the image size is varied.

Automatic image rotating apparatus 40 is located forwardly of the zoom lens system. Light rays forming the projected image which exit from the image rotator are reflected in three plane mirrors 42, 43 and 44 which fold the optical path and ultimately project the enlarged image onto the back of screen 22 for convenient viewing by the user. Mirror 44 is pivotally mounted at 50 for clockwise movement to a position 51 shown in dotted lines which is out of the light path of the image reflected from mirror 43. In this position, the enlarged image is reflected generally upwardly from mirror 43 toward a platen 51 forming an image plane 52 at printout station 54 housed at the top of the reader-printer. Photosensitive paper is normally supplied at the image plane for making a photocopy reproduction of the enlarged image.

Turning now to FIG. 2 of the drawings, the prime lens, zoom lens and image rotator are supported on a rigid, horizontal interior wall 74 disposed approximately midway between shelf 24 and bottom wall 12, by an upstanding rear support 76, an intermediate zoom lens support 78, and a front image rotator support 80.

The zoom lens system is housed in a rotatable barrel 62 which is manually adjusted by a pair of circular members 63. A small portion of members 63 protrude through shelf 24 in a manner not shown in FIG. 1 for convenient adjustment by the operator. Movement of the zoom barrel is transmitted to the light condenser by a notched belt 68 trained about a notched pulley 66 on the barrel and a second notched pulley 70, in a manner shown only schematically by the dashed line 37 in FIG. 1 to eliminate optical aberrations upon varying the size of the image through use of the zoom control.

A second thumb-operated control comprising a single circular member 72 is provided for performing minor focusing adjustments during use of the reader-printer.

Referring now to FIGS. 3 and 4 in addition to FIG. 2, the illustrated embodiment of the automatic image rotating apparatus of the invention includes a Pechan prism 84, well-known by those in the art, for effecting actual image rotation. While a Pechan prism is shown, other prisms capable of reorienting an image through a given angle, such as a dove or Williston prism, may also be used without departing from the invention.

Pechan prism 84 is mounted in a carrier 86 which is journaled in front support 80 for rotational movement relative to the zoom barrel. As noted briefly above, prism 84 is mounted in the path of light projected through the zoom lens system, located between the zoom lens and mirror 40. When the prism is positioned in its normal or upright position, the orientation of the image projected through the zoom lens is unchanged, that is, the orientation of the image entering the prism is identical to the orientation of the image exiting it. However, upon angularly displacing the Pechan prism, the projected image exiting the prism is angularly displaced relative to the image entering it by a factor of two times the prism's angular movement. Thus, for a prism movement of 45°, the image projected from the prism will be reoriented by a total angle of 90°.

As best seen in FIG. 4, prism carrier 86 is driven by a reversible electric drive motor 88 secured to a plate 90 which is securely fastened to front support plate 80 by means of threaded fasteners 92. A motor gear 94 extending from the front end of motor 88 meshes with an idler gear 96 journaled on a rearwardly extending shaft 98 carried by support plate 80. Gear 96 drives a large ring gear 100 integral with carrier 86 but located rearwardly of plate 80. Thus, energization of motor 88 causes rotational movement of ring gear 100 to implement rotation of carrier 86 and prism 84 to thereby angularly displace or reorient the projected image.

Energization and directional control of motor 88 are regulated by a pair of spaced apart electrical switches 102 and 104 located adjacent the rear portion of carrier 86 and a cooperating switch actuator 106 secured to the carrier.

Specifically, switch 102 is secured outwardly adjacent the carrier to an irregularly shaped switch bracket 110 which is pivotally mounted at 112 to the top right corner (FIG. 3) of support 80. Switch 102 includes an integrally hinged switch lever 114 having an end 116 extending into the path of switch actuator 106. Lever 114 cooperates with a switch button 118 which in turn causes physical movement of an internal movable switch contact, not shown. Three electrical terminals 102a, 102b and 102c are provided outwardly of the switch for connecting suitable electrical conductors.

The lower end of switch bracket 110 includes a perpendicular ear 124 which receives an adjusting screw 122 having a locknut 123. A stop plate 126 secured to the support plate forms a bearing surface cooperating with the front end of screw 122. The position of switch 102 relative to actuator 106 may be adjusted by threading screw 122 inwardly or outwardly of ear 124 thereby causing pivotal movement of switch bracket 110. As screw 122 is backed out of the bracket, actuator 106 contacts lever end 116 at an earlier point during its course of counterclockwise movement. Conversely, as the screw is turned inwardly, actuator 106 strikes lever 114 at a later position during its counterclockwise angular movement.

Switch 102 and the switch actuator define the "home" or normal position of prism 84 with the image projected onto the screen. The adjustment screw enables an operator to precisely adjust the prism in this home position to obtain a level, horizontal image on the screen.

Similarly, lower switch 104 is mounted on a switch bracket 130 pivotally secured to the lower end of support 80 at 132. Bracket 130 includes an adjustment screw 134 and locknut 134a which engage plate 126 in a manner similar to that described in connection with switch 102. Switch 104 includes a lever 138 having an end 135 disposed in the path of movement of actuator 106, a switch button 136 for actuating the internal switch contacts, and two electrical contacts 104a and 104b. A tension spring 137 is provided for biasing brackets 102 and 104 clockwise and counterclockwise, respectively for firm cooperation with member 126.

Figure 5:
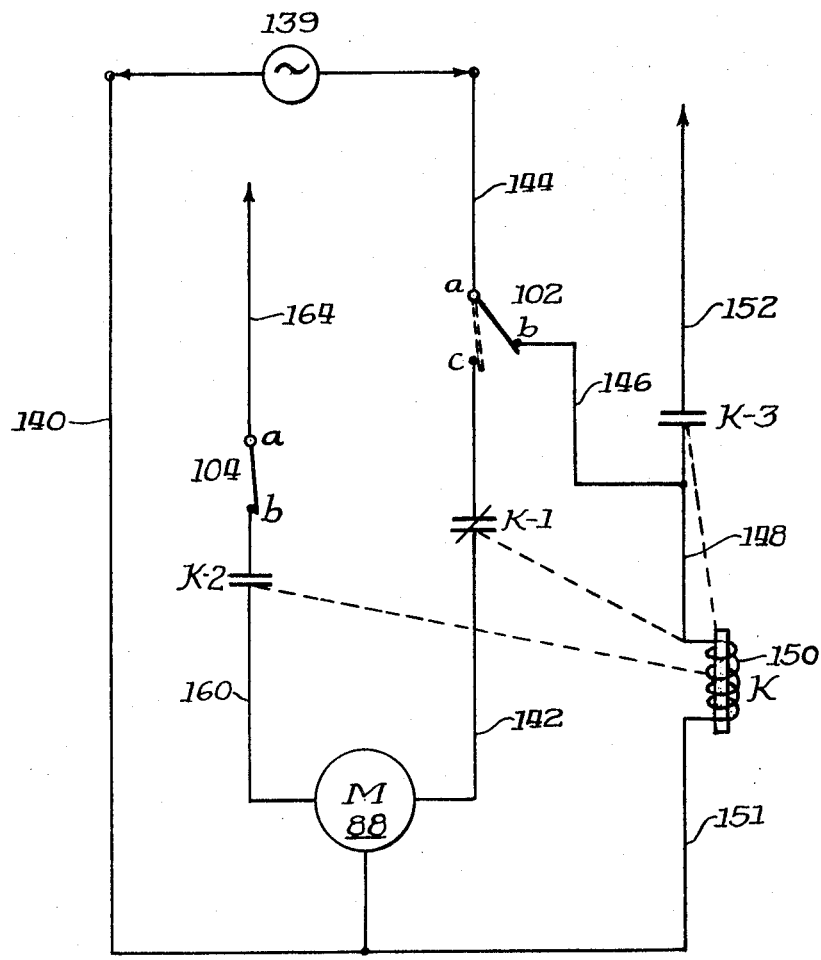
FIG. 5, on the same sheet as FIG. 1, is a simplified wiring diagram of the drive motor, control switches, and printout station of the invention.

The electrical diagram of FIG. 5, illustrates a suitable interconnection of the switches and drive motor for accomplishing the automatic image rotation of the invention. For clarity and ease of understanding, only the electrical components necessary for controlling operation of the image-rotator are shown in FIG. 5.

One side of an AC electrical source 139 is connected by a lead 140 to the common drive terminal of drive motor 88. Drive motor 88 is of the well known synchronous, bi-directional type. The reverse drive terminal of motor 88 is electrically coupled by a lead 142 to terminal 102c of single pole double throw switch 102 through a pair of normally closed relay contacts, K-1. The reverse drive circuit to the source is completed through a movable switch element, terminal 102a and lead 144.

Switch terminal 102b is connected by a lead 146 to a lead 148 having a first end connected to one side of relay contacts K-3 and having the other end connected to a coil 150 of a relay K. The other side of relay contacts K-3 is connected by a lead 152 to a cam operated switch which controls, in the first instance, the supply of electric current to relay coil 150. The current path from the coil is completed through a lead 151 connected to lead 140.

The forward drive terminal of motor 88 is electrically coupled by a lead 160 to terminal 104b of single pole single throw switch 104 through relay contacts K-2. Switch terminal 104a is connected to a suitable power source such as at the "hot" side of the high voltage transformer primary winding, through a lead 164. The primary winding is energized during the forward drive portion of the cycle, but is deenergized prior to the time that the rotator reaches its home position during reverse operation.

Relay K is mechanically coupled to contacts K-1, K-2 and K-3 as schematically depicted by the dashed lines in FIG. 5.

Operationally, prior to energizing the reader-printer, switch 104 assumes its normally closed position as illustrated in FIG. 5, switch 102 assumes its normal solid line position between switch terminals 102a and 102b, and relay contacts K-2 and K-3 are open while relay contacts K-1 are closed. Upon energizing the reader-printer, relay coil 150 is energized through lead 144, switch contacts 102a–b and leads 146 and 148. The current returns to the source through a path comprising leads 151 and 140. When coil 150 is energized, the relay pulls in closing contacts K-2 and K-3 and opening contacts K-1. The relay contacts assume these conditions while power is supplied to the reader-printer and during the time that the image-rotator is nonoperational.

Relay contacts K-3 function to lock relay K in its energized state. Also, it should be noted that switch 104 is normally closed as illustrated when the image-rotator is in its normal or home position. Switch 102 is in the solid line position when the image-rotator is in its normal position with actuator 106 engaging switch lever 114. While the rotator is in its home position, power is not applied to lead 164.

Upon actuation of print button 166, power is simultaneously supplied to the primary winding of the high voltage transformer and to the forward drive terminal of motor 88 through lead 164, closed switch 104, relay contacts K-2 and lead 160. As the motor is energized and the prism begins to rotate, actuator 106 releases lever 114 and movable switch contact transfers from terminal 102b to 102c. Transfer of the switch contact has no effect on the energization of motor 88 since relay contact K-1 is open. Also, the relay coil 150 remains energized through locking contact K-3 which is supplied with current through the closed cam operated switch in the printout station. The motor is operated for a sufficient length of time to rotate the image-rotator through an angle of approximately 45°, desirably about three seconds. Actuator 106 now engages switch lever 134 opening switch 104 and terminating the flow of current to motor 88 since contacts K-1 are also open.

During this stage of the cycle, motor 88 is deenergized and the prism is stationary as the conventional charging and exposing operations are carried out in the printout station. After a predetermined time as may be gauged by a prescribed movement of the cam and actuation of its associated printout station switch the current supply to lead 152 is terminated which deenergizes coil 150 and allows the relay to drop out. This opens contacts K-2 and K-3 and closes contacts K-1. Since the movable contact of switch 102 is in its dotted line position between terminals 102a and 102c current is now supplied to the reverse motor lead 142 causing it to rotate in a direction which returns the prism to its normal position. As the motor begins to rotate in its reverse direction actuator 106 releases switch lever 134 closing contacts 104a and 104b; however, there is no change in the motor operation since the high voltage transformer primary winding, to which lead 164 is connected, is now in a deenergized state.

When the prism returns to its home position, actuator 106 again strikes switch lever 114 thereby transferring the movable element so that it assumes its solid line position thereby cutting off the flow of current to motor 88 and re-energizing coil 150. The image-rotator is now in its home position as employed for viewing the micro-images on screen 22.

Thus, for each printout cycle of the reader-printer, the apparatus of the invention automatically energizes the drive motor to reorient the image 90° on the printing plane for full width reproduction of the image, initiates operation of the printout station to obtain a photo reproduction of the image, and thereafter automatically returns the projected image to its original orientation on screen 22. Each of the above operations is effected automatically upon actuation of printout button 166, thus relieving the operator of all additional responsibility.

It is obvious that upon study by those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are defined as follows:

1. Apparatus for automatically rotating a projected image comprising: optical means interposed in the image light path for angularly displacing the projected image; drive means for imparting movement to said optical means for varying the arc through which the image is displaced; and selectively operable control means for automatically controlling operation of said drive means for movement of said optical means from a home position through a prescribed angle to an operating position, including switch means and switch actuator means mounted for actuating the switch means responsive to movement of the optical means to each of said home and operating positions and control means energized by said switch means for reversing the direction of said drive means with the optical means in each of said positions for movement of the optical means to the other position.

2. The apparatus as set forth in claim 1 including additionally: a rotatably supported carrier supporting said optical means; and wherein said drive means comprise a drive motor coupled to the carrier for imparting angular movement thereto about an axis generally parallel to the entering and emerging image light path through said optical means, said control means including relatively movable switch actuating means and a switch coupled to said drive motor.

3. The apparatus as set forth in claim 2 wherein said optical means comprise a prism; said control means comprising a pair of spaced-apart switches disposed adjacent said carrier and coupled to said drive motor; said switch actuator being secured to said carrier, and wherein said actuator and the other switch define the operational position of said carrier.

4. The apparatus as set forth in claim 3 including additionally: a pair of switch brackets each carrying one of said switches mounted for pivotal movement relative to said prism, and means for moving each of said brackets for adjusting the home and operational limit positions of said prisms.

5. A micro-image reader-printer comprising a light source; a projection screen; an image projection system disposed between the light source and the screen for projecting an enlarged image; a printing station including an image plane; means for selectively directing the enlarged image from the projection system onto the screen or the image plane; automatic image reorienting means including a prism disposed in the image light path and mounted for angular movement between a home position for projecting the enlarged image onto the screen in a first image orientation and an operational printout position for projecting the enlarged image onto the image plane in a second image orientation; motor means drivingly coupled to said prism for moving the prism between said home and printout positions, switch means for controlling said motor means for moving the prism from one of said positions to the other, and actuator means mounted for relative movement with respect to said switch means for actuating said switch means with the prism in either home or operational printout position to move the prism to the other of said positions, whereby on moving said image from the projection screen to the image plane the drive motor moves the prism from home position to operational printout position and is re-energized to return the prism to home position on return of the projected image to the screen.

6. The micro-image reader-printer as set forth in claim 5 wherein said actuator means is mounted for movement coincident with said prism and said switch means includes first and second switches positioned to be actuated by said actuator, each mounted adjacent to said prism, and means adjustably supporting each of said switches relative to said actuator for varying the limit of movement to which said prism is rotated and adjusting the arc through which the projected image is reoriented.

* * * * *